United States Patent [19]

Tiernan, Jr.

[11] Patent Number: 4,804,288
[45] Date of Patent: Feb. 14, 1989

[54] COUPLING ATTACHMENT
[75] Inventor: Richard J. Tiernan, Jr., Hobe Sound, Fla.
[73] Assignee: United Technologies Corporation, Hartford, Conn.
[21] Appl. No.: 133,474
[22] Filed: Dec. 15, 1987
[51] Int. Cl.⁴ ............................................... F16D 1/00
[52] U.S. Cl. ........................................ 403/24; 403/26; 403/359; 403/337
[58] Field of Search ............... 403/359, 337, 24, 26, 403/286, 287

[56] References Cited

U.S. PATENT DOCUMENTS

| | | | |
|---|---|---|---|
| 2,764,266 | 9/1956 | Haworth | 403/22 |
| 3,612,583 | 10/1971 | Anderson | 403/359 |
| 3,713,676 | 1/1973 | Carlstrom et al. | 403/37 |
| 3,970,398 | 7/1976 | Wilson | 403/359 |

Primary Examiner—Andrew V. Kundrat
Attorney, Agent, or Firm—Edward L. Kochey, Jr.

[57] ABSTRACT

Two shafts 12, 14 are secured axially with bolts 58 through flanges 22 and 32. Coupling 42 is splined to the shafts and resists bending by interaction of bearing surfaces 46, 44, 48 and 50. Threads 66 on one end of the shaft and an inwardly extending flange 68 on the coupling provide a means for removing a shaft without placing axial loading on bearing 18. Either shaft may be removed while leaving the coupling 42 in place to protect the bearing compartment. Axial loading is taken by bolts 58, torque loading by splines 30, 40 and bending moment taken by the interacting surfaces.

3 Claims, 1 Drawing Sheet

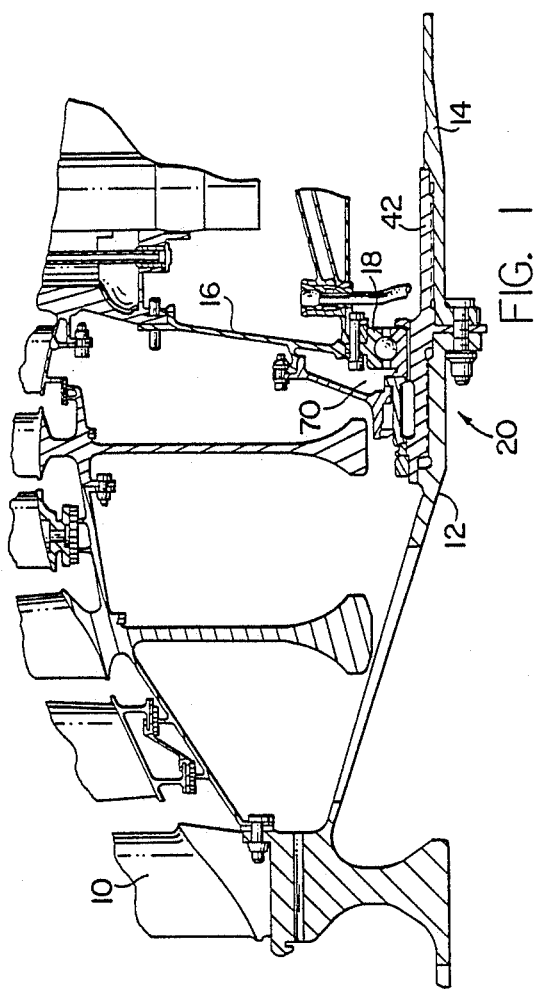
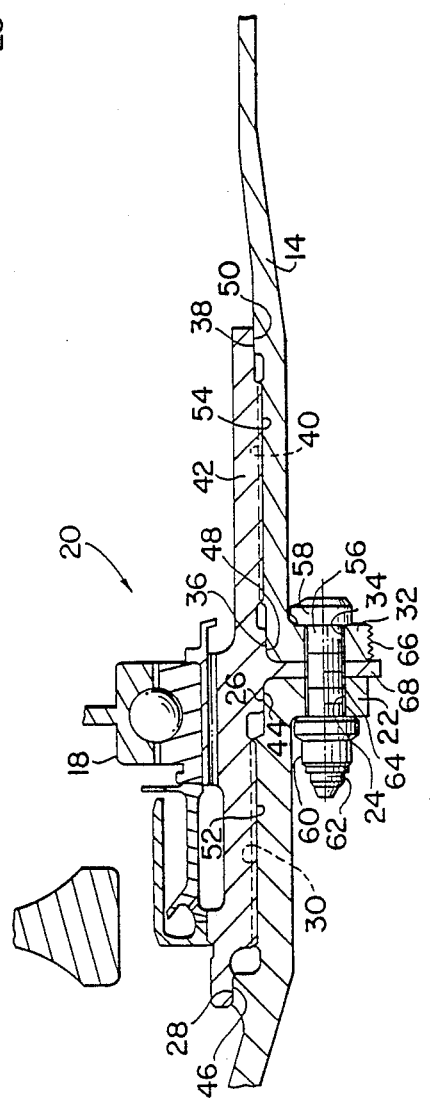
FIG. 1
FIG. 2

COUPLING ATTACHMENT

The Government has rights in this invention pursuant to a contract awarded by the Department of the Air Force.

TECHNICAL FIELD

The invention relates to gas turbines and in particular to joining of hollow rotating shafts thereof.

BACKGROUND

In a gas turbine the shaft connecting the fan and the low turbine must be detachably connected to permit removal of either component. The shaft and its connection must tolerate not only axial and torque loads, but also bending loads because of bearing support loads. In a conventional bolted joint bending places high tensile loads in the bolts.

This support bearing is located between the fan and the low turbine and therefore in the area of the coupling between the shafts. Removal of either shaft may damage the bearing if axial pulling loads are placed on the bearing. Removal of the bearing increases the work involved and also opens the bearing compartment to possible contamination.

It is an object of the invention to carry torque loads on splines, axial loads on bolts, and bending loads on the coupling-shaft interface, thereby minimizing bolt loading.

It is a further object to remove a shaft without loading the bearing and to minimize bearing compartment contaminations during overhaul.

SUMMARY OF THE INVENTION

Two hollow shafts are joined with a surrounding coupling which in turn carries the inner race of a support bearing. This coupling is splined to each of the shafts and has two interference fit axially spaced bearing surfaces with each of the shafts so that bending moments may be taken by the bearing surfaces against the shaft. The splines carry the torque loads.

The coupling has an inwardly extending flange which fits between inwardly extending flanges on the end of each coupling. These flanges are bolted together through bolt holes which have more clearance than the splines so that all torque loading is carried by the spline without placing significant torque loading on the bolts. The bolts serve to restrain axial loading.

At least one of the inwardly extending flanges on the end of a shaft has threads thereon, and the flange from the coupling extends inwardly beyond the flange on the end of the shaft. Accordingly, a tool may be placed through the shaft and threadedly engaged with the end of the shaft with the end of the tool abutting the flange of the coupling. By rotating the tool the load for withdrawing the shaft is placed between the shaft itself and the coupling, thereby avoiding any axial load on the bearing during disassembly.

When either shaft is removed the coupling is left in place along with the bearing thereby minimizing potential of contamination of the bearing compartment.

BRIEF DESCRIPTION OF THE DRAWINGS

FIG. 1 is a sectional view of a gas turbine engine in the area of the coupling; and FIG. 2 is a sectional view detail of the coupling.

DESCRIPTION OF THE PREFERRED EMBODIMENT

Gas turbine engine fan 10 is mounted on fan shaft 12 while a turbine (not shown) is mounted on turbine shaft 14. These shafts when secured together are supported from static structure 16 by bearing 18. These shafts are joined together by a coupling structure 20.

The fan shaft 12 has at its end an inwardly extending flange 22 including a plurality of bolt holes 24 and also includes an outwardly facing shaft bearing surface 26 circumferentially around the shaft at the end. Spaced therefrom is a second circumferentially extending outwardly facing bearing surface 28 with a fan shaft spline 30 located between the shaft bearing surfaces.

In a similar manner turbine shaft 14 has an inwardly extending flange 32 with a plurality of bolt holes 34 at the end. It has near the end an outwardly facing circumferential shaft bearing surface 36 and axially spaced therefrom is a fourth outwardly facing circumferential shaft bearing surface 38. A spline 40 on a shaft is located between the two bearing surfaces.

A cylindrical coupling 42 surrounds the ends of the two shafts. It includes a first inwardly facing circumferential coupling bearing surface 44 which is an interference fit with surface 26 in the order of 0.004 inches on a diameter of four inches. Axially spaced therefrom on a coupling is a second inwardly facing circumferential facing coupling bearing surface 46 which has a similar interference fit with surface 28.

On the turbine end of the coupling there is a third inwardly facing circumferential coupling bearing surface 48 in interference fit with surface 36 and a fourth inwardly facing circumferential bearing surface 50 in interference fit with surface 38. The coupling has splines 52 located between surfaces 44 and 46 with these splines being a loose fit with fan shaft spline 30. It also contains spline 54 between surfaces 48 and 50 in loose fit with spline 40 of shaft 14.

It can be seen that loading from bearing 18 will cause bending in the shaft. Such bending is resisted on the fan side by the resisting moment established through surfaces 44 and 46 and on the turbine side by the interaction of surfaces 48 and 50. These surfaces being spaced from one another provide the means for accepting the bending moment without placing any significant loading on bolts 56.

These bolts 56 are placed through the axially aligned holes 24 and 34 in the shaft ends. The head 58 of the bolt may be a D shape with a flat bearing against shaft 14 thereby preventing rotation thereof. Nut 60 is placed on the bolt with the bolt preferably having excess length 62 to facilitate assembly. The bolt 56 may thereby be used to finally draw the shafts together overcoming the resistance of the interference fits.

The splines 30 and 52 as well as 40 and 54 have some clearance therebetween so that while they carry torque loading some minimal movement can be expected. Accordingly, clearance 64 is provided in the bolt holes so that this minimal rotational relative movement may occur without placing shear loading on the bolts.

The inner edge of flange 32 has threads 66. The coupling 42 has an inwardly extending flange 68 which has a smaller inside radius than the threads 66 on the end of flange 32. According, a tool may be placed axially through shaft 14 engaging threads 66. It may be rotated placing loading against the flange 68 so that shaft 14 may be withdrawn from coupling 42 without placing any axial loading on bearing 18.

The fan shaft 12 is removed by inserting a rod until it contacts flange 68. The other end of the rod is attached to tooling which is threaded onto the forward end of the fan shaft 12. Threads or hydraulics on this tooling pull on the forward end of fan shaft 12 while pushing through the rod on flange 68, so that shaft 12 may be withdrawn from coupling 42 without placing any axial loading on bearing 18.

When either shaft is removed coupling 42 is left in place thereby obviating any need to disassembly bearing 18 and providing protection against contamination of bearing compartment 70.

It can be seen that all substantial bending moments on the shaft are resisted through the coupling by the interference fit surfaces avoiding excessive tensile loading on the bolts. The bolts 56 are only required to contain axial loading. All torque loading is carried through the splines with sufficient clearance left on the bolts to avoid inadvertent shearing of these bolts. It is also noted that the tie bolts may be assembled without the need of special tools.

I claim:

1. An apparatus for joining rotating shafts of two components of a gas turbine engine comprising:
   a first hollow shaft;
   a second hollow shaft axially aligned with said first shaft;
   a first inwardly extending flange at the end of said first shaft;
   a circumferential outwardly facing first shaft bearing surface adjacent to said end of said first shaft;
   a circumferential outwardly facing second shaft bearing surface on said first shaft axially spaced from said first shaft bearing surface;
   a first shaft spline on said first shaft between said first and second shaft bearing surfaces;
   a second inwardly extending flange at the end of said second shaft;
   a circumferential outwardly facing third bearing surface adjacent to said end of said second shaft;
   a circumferential outwardly facing fourth shaft bearing surface axially space from said third bearing surface;
   a second spline on said second shaft between said third and fourth shaft bearing surfaces;
   a cylindrical coupling surrounding said ends of said first and second shafts;
   a circumferential inwardly facing first coupling bearing surface on said coupling in interference fit with said first shaft bearing surface;
   a circumferential inwardly facing second coupling surface on said coupling in interference fit with said second shaft bearing surface;
   a third circumferential inwardly facing coupling surface on said coupling in interference fit with said third shaft bearing surface;
   a fourth circumferential inwardly facing coupling surface on said coupling in interference fit with said fourth shaft bearing surface;
   an internal first coupling spline engaged with said first shaft spline;
   an internal second coupling spline engaged with said second shaft spline;
   an inwardly extending coupling flange on said coupling and in abutting contact between said first and second flanges;
   a plurality of aligned bolt holes through said first flange, second flange and coupling flange; and
   a plurality of bolts within said bolt holes and having clearance exceeding the circumferential clearance between said engaged splines.

2. An apparatus as in claim 1:
   a bearing including an inner race and an outer race;
   a static turbine component;
   said outer race secured to said static component; and
   said inner race secured to said coupling.

3. An apparatus as in claim 2:
   said coupling flange extending inwardly to a radius less than the radius of the inner edge of said first and second flanges; and
   at least one of said first and second flanges having the radially inwardly facing edge threaded.

* * * * *